C. D. ALLAN.
RADIATOR CONTROL VALVE.
APPLICATION FILED DEC. 14, 1914.

1,142,389.

Patented June 8, 1915.
2 SHEETS—SHEET 1.

Witnesses
Martin H. Olsen.
F. M. Reichel.

Inventor
Charles D. Allan
By Ind. E. Waldo.
Atty.

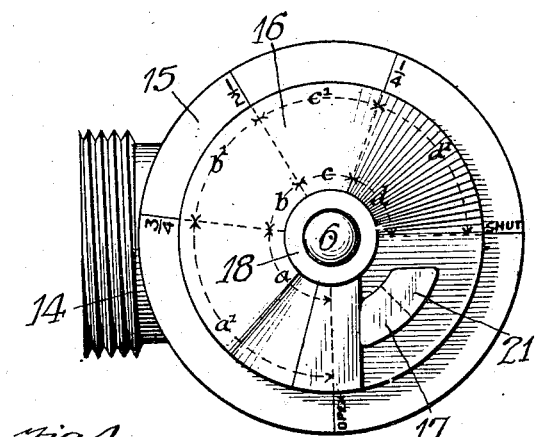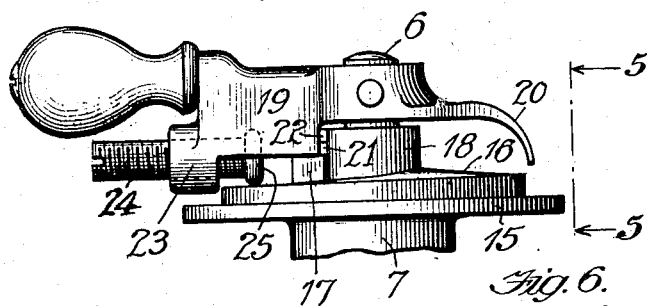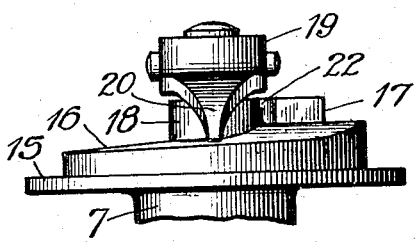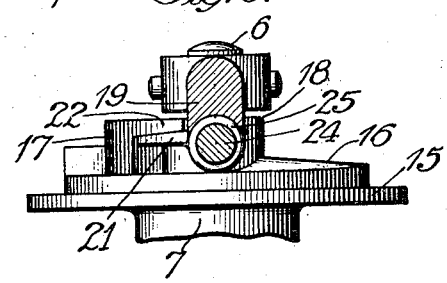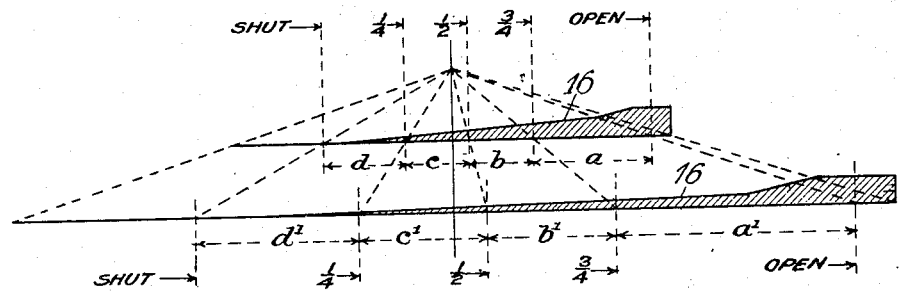

UNITED STATES PATENT OFFICE.

CHARLES D. ALLAN, OF CHICAGO, ILLINOIS.

RADIATOR-CONTROL VALVE.

1,142,389.  Specification of Letters Patent.  Patented June 8, 1915.

Application filed December 14, 1914. Serial No. 877,160.

*To all whom it may concern:*

Be it known that I, CHARLES D. ALLAN, a citizen of the United States, and a resident of Chicago, in the county of Cook and State of Illinois, have invented a certain new and useful Improvement in Radiator-Control Valves, of which the following is a specification.

This invention relates to valves for controlling the steam supply to radiators, and more particularly to the type of valves that are provided with a graduated dial and indicator and are used with "vapor" or "modulating" systems of steam heating, in which it is intended to keep warm only such parts of each individual radiator, as may be necessary to maintain the desired room temperature.

Most of these valves of which I have any knowledge, have no mechanism for adjusting them so that the position of the indicator on the dial will determine the amount of the radiator warmed, notwithstanding its total heating surface, if within the capacity of the valve. Valves of this type are ordinarily made in four sizes 1/2", 3/4", 1" and 1 1/4", which must serve for an unlimited number of radiator capacities, so that unless there be means of changing the degree of opening of the valve per unit of rotary motion of the stem, the dial graduations cannot be made to indicate the corresponding fractional heating of the radiator.

My invention therefore has for its object to provide a construction for a radiator control valve, having calibrating mechanism, the adjustment of which will permanently insure the fractional heating of any size radiator within its capacity to which it may be applied, as called for by the position of the indicator on the graduated dial, provided the steam pressure be reasonably constant.

My invention has for its further object to provide a construction that is sufficiently simple so that such a valve can be manufactured at a cost which is very little if anything in excess of that for valves which are not provided with such an adjusting device.

To effect the foregoing objects, a valve of my invention comprises the various features, combinations of features and details of construction hereinafter described and claimed.

Figure 1:
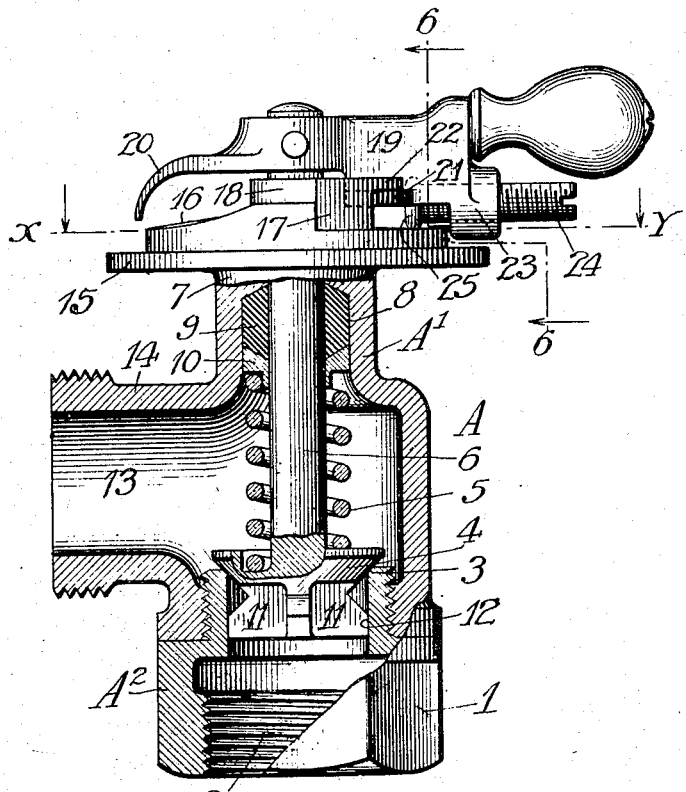
Figure 2:
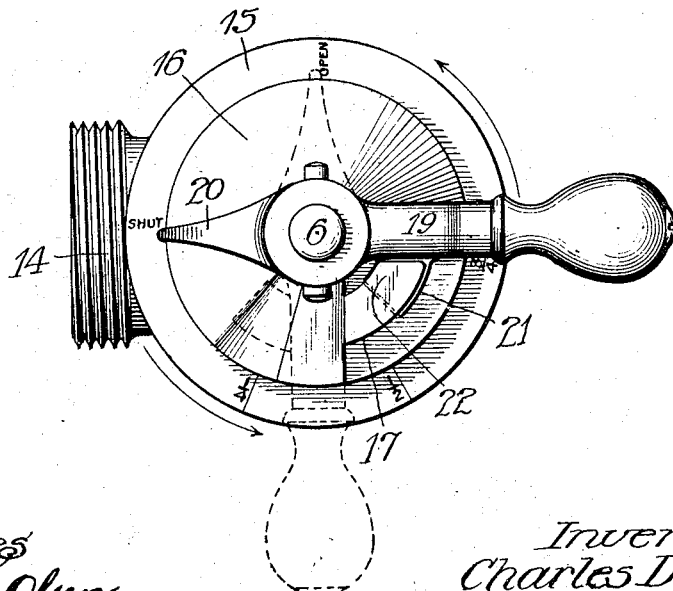

In the accompanying drawings, in which my invention is fully illustrated, Figure 1 is a combined elevation and central sectional view of a valve of my invention. Fig. 2 is a top plan view showing the valve in closed position in full lines and the open position thereof in dotted lines. Fig. 3 is a top plan view of my improved valve with the operating lever removed. Fig. 4 is a side view of the upper end of my improved valve including the operating and regulating mechanism, taken from a position opposite to that from which Fig. 1 is taken. Fig. 5 is a view of the parts shown in Fig. 4 taken from the position 5—5, Fig. 4. Fig. 6 is a sectional elevation of the upper part of the valve on the line 6—6 of Fig. 1 looking in the direction indicated by the arrow; and Fig. 7 is a sectional development of the cam surface on the upper face of the dial above the datum plane $x$—$y$, Fig. 1, on the arcs $a$—$b$—$c$—$d$ and $a'$ $b'$ $c'$ $d'$ respectively, Fig. 3.

Referring now to the drawings, A designates the valve casing as a whole, which for convenience of manufacture and to provide for assembling the same, is made in two separate sections, and comprises an upper section A' and a lower section $A^2$ which are detachably connected by screw threads adapted to be operated by the hexagon 1 formed on the section $A^2$ of the valve casing, a tight joint being formed between the parts of said valve casing by finishing the contacting surfaces thereof.

Extending through the section $A^2$ of the valve casing is an inlet passageway 2 which is screw threaded at its outer end to provide for making a steam connection thereto, and formed at the inner end of which is a valve seat 3.

The steam inlet 2 is controlled by a valve 4 which coöperates with the valve seat 3, said valve being maintained normally closed by a spring 5 applied thereto. In the preferable construction shown, the valve 4 consists of a head formed on the lower end of the valve stem 6, which is fitted to a bearing in a hollow boss 7 forming part of the valve casing section A', said bearing being in axial alinement with the valve seat 3. The valve stem bearing is packed to maintain a tight joint around same, in the following manner:—Formed in the boss 7 at the inner end of the valve stem bearing is a stuffing box 8 in which the packing 9 is confined by a packing gland 10, desired pressure being exerted on the packing 9 by the reaction of the spring 5, which is inserted between the valve 4 and the packing gland 10 and which surrounds the valve stem 6. The valve is guided in its movement toward and from the valve seat 3 by usual radial wings or vanes 11 on the under side of said valve, which are fitted to a cylindrical bore 12 formed in the section $A^2$ of the valve casing below said valve seat.

The section A' of the valve casing is provided with a discharge opening 13 which, as shown, is formed through a lateral boss or projection 14 on said valve casing section, said boss or projection being threaded at its outer end to provide for making pipe connections thereto.

Rigidly secured to the upper end of the valve casing A, being preferably formed integral therewith, is a dial 15, formed on the upper surface of which is a cam surface 16, said dial being provided with graduations to indicate various degrees of opening of the valve 4, as shown in Fig. 3, a limit stop 17 and the bearing sleeve 18 for the valve stem 6.

The valve 4 is adapted to be operated by a lever 19 pinned or otherwise rigidly secured to the upper end of the valve stem 6 and which comprises, as component parts, an indicator 20, a projecting lug 21 adapted to engage beneath a projecting lug 22 on the limit stop 17 to secure the valve to its seat when closed, and with a boss 23 on its under side extending through which is a hole or opening secured in screw threaded engagements with which is an adjusting screw 24, said screw 24 having at one end a bead 25 which rides upon the cam surface 16 when the valve stem is turned axially.

The under surface of the operating lever 19, as shown in Fig. 6, is formed to a concave half cylinder of the same diameter as the bead 25 so that the half of the periphery of the bead that is uppermost is in contact with it.

The method of operating my improved valve is as follows: In Fig. 2 is shown the position of the operating lever 19, when the valve is closed, the indicator 20 being then over the word "Shut" on the graduated dial 15. In this position the upper surface of the lug 21 projecting from the operating lever 19 engages with the under surface of the lug 22 projecting from the limit stop 17, both of said surfaces being correspondingly inclined at a slight angle to the horizontal, thus producing a wedging effect which will hold the valve securely to its seat when closed.

To completely open the valve from its closed position, the valve stem 6 must be turned three quarters of one complete revolution by means of the operating lever 19, the indicator 20 of which will then travel in a circular direction, as shown by the arrows, until it reaches the position over the word "Open" as shown by the dotted lines in Fig. 2. During this operation the valve 4 is raised from its seat against the tension of the spring 5 by the action of the bead 25 on the screw 24 riding on the cam surface 16 on the upper surface of the dial 15. To more clearly illustrate the action of the cam surface 16 in opening the valve, Fig. 3 and Fig. 7 have been developed.

Fig. 3 is a plan view of the said dial showing the cam surface and graduations thereon, consisting of the marks "Shut" 1/4, 1/2, 3/4 and "Open" and which are each placed on the opposite side of the dial from the corresponding graduations in Fig. 2. The purpose of this arrangement is that the graduations in Fig. 3 may indicate the position of the bead 25 on the cam surface 16 for corresponding valve positions, which will make the operation of opening and closing easier to follow. The dial graduations in Fig. 2 are as they should be when the valve is made and refer to the positions of the indicator 20, and as the bead 25 must always be on the opposite side of the dial from the said indicator, dial graduations, as in Fig. 3, that refer to the position of the bead 25 must be opposite to corresponding graduations referring to the position of the indicator 20.

Fig. 7 shows two sectional developments of the cam surface 16 above the horizontal datum plane x—y, Fig. 1, the shorter development being on the arc a—b—c—d, Fig. 3, near the inner edge of said cam, and the longer on the arc a'—b'—c'—d' near the outer edge of said cam, both arcs being concentric with the valve stem 6. From this it can be seen that the upward pitch or slope of this cam surface or its rate of deviation from the datum plane x—y per unit of angular movement from the "shut" position is much greater along the inner arc a—b—c—d than along the outer arc a'—b'—c'—d' and similar developments along intermediate parallel arcs would have intermediate proportional slopes.

As in the operation of opening, the valve 4 is raised from its seat 3 against the tension of the spring 5 by the bead 25 riding upward on the cam surface 16 in an arc concentric with the stem 6, it therefore follows that the rate of vertical movement of the valve 4 per unit of rotary motion of the stem 6 depends upon the distance of the bead 25 from said valve stem 6, increasing or decreasing within the limits of the pitch or slope of said cam surface 16 at its inner and outer periphery, as the bead 25 is brought nearer to or farther from the said stem 6 by the adjusting screw 24. Consequently the fractional heating of an individual radiator can be made to conform to the position of the indicator on the graduated dial, for if the pitch of the inner and outer circular edges of the cam surface 16 are made to suit radiators of maximum and minimum heating surface which can be served by the given valve size, then the same valve can serve a radiator of any intermediate heating surface capacity, as the bead on the adjusting screw can be moved so that it will travel over the cam surface in an arc of any intermediate slope desired. In this way the principal object of this invention is attained, to wit, to provide a valve which will insure the fractional heating of a radiator in accordance with the position of the indicator on the graduated dial.

When the indicator reaches the graduation marked "Open," in Fig. 2, the bead 25 is at the angular position marked "Open" in Fig. 3 and is at a height above the datum plane $x-y$ which is the same regardless of its distance from the stem, as is clearly shown in the sectional developments in Fig. 7. In other words the free area of opening for the "open" position is the same for all sizes of radiators, the modulating effect being sought only in the fractional positions and not in the completely open or closed positions.

When the valve reaches a completely open position as indicated by the position of the operating lever shown in dotted lines in Fig. 2, further motion in a direction to open is prevented by the limit stop 17.

Claims.

1. In a valve of the type described, coacting means attached to the stem and casing for varying the free area of opening of the valve, said means consisting of a cam surface rigidly attached throughout to one and a rigidly supported member adjustably attached to the other, which member rides on said cam surface as the valve stem is turned axially and means for holding said member in contact with said cam surface, substantially as described.

2. In a valve of the type described, coacting means attached to the stem and casing for varying the free area of opening of the valve, said means consisting of a cam surface rigidly attached throughout to one and a rigidly supported member adjustably attached to the other, which member rides on said cam surface as the valve stem is turned axially, means for holding said member in contact with said cam surface and means for tightly securing said valve to its seat when in a closed position, substantially as described.

3. In a valve of the type described, coacting means attached to the stem and casing for varying the free area of opening of the valve, said means consisting of a cam surface rigidly attached throughout to one and a rigidly supported member adjustably attached to the other, which member rides on said cam surface as the valve stem is turned axially, means for holding said member in contact with said cam surface and means for tightly securing said valve to its seat when in closed position, comprising interlocking projections attached to said valve stem and casing, substantially as described.

4. In a valve of the type described, coacting means attached to the stem and casing for varying the free area of opening of the valve, said means consisting of a cam surface rigidly attached throughout to one and a rigidly supported member adjustably attached to the other, which member rides on said cam surface as the valve stem is turned axially, its point of contact traveling in a circular path concentric with the longitudinal axis of the stem, means for adjusting the distance of said point of contact from the longitudinal axis of the stem, the contour of said cam surface being such that the rate of variation of free area of opening of the valve per unit arc of axial turning of the stem changes when the distance of said point of contact from the longitudinal axis of said stem is changed and means for holding said member in contact with said cam surface, substantially as described.

5. In a valve of the type described, coacting means attached to the stem and casing for varying the free area of opening of the valve, said means consisting of a cam surface rigidly attached throughout to one and a rigidly supported member adjustably attached to the other, which member rides on said cam surface as the valve stem is turned axially, its point of contact traveling in a circular path concentric with the longitudinal axis of the stem, means for adjusting the distance of said point of contact from the longitudinal axis of the stem, the contour of said cam surface being such, that the rate of variation of free area of opening of the valve per unit arc of axial turning of the stem, changes when the distance of said point of contact from the longitudinal axis of said stem is changed, means for holding said member in contact with said cam surface and means for tightly securing said valve to its seat when in a closed position comprising interlocking projections attached to said stem and casing, substantially as described.

6. In a valve of the type described, coacting means attached to the stem and casing for varying the free area of opening of the valve, said means consisting of a cam surface rigidly attached throughout to one and a rigidly supported member adjustably attached to the other, which member rides on said cam surface as the valve stem is turned axially, its point of contact traveling in a circular path concentric with the longitudinal axis of the stem, means for adjusting the distance of said point of contact from the longitudinal axis of the stem, said cam surface terminating at each circumferential end in a surface substantially perpendicular to the longitudinal axis of said stem, on one of which surfaces the said member rests when the valve is in a completely open or closed position, the contour of said cam surface being such that the rate of variation of free area of opening of the valve per unit arc of axial turning of the stem changes, when the distance of said point of contact from the longitudinal axis of said stem is changed and means for holding said member in contact with said cam surface, substantially as described.

7. In a valve of the type described, coacting means attached to the stem and casing for varying the free area of opening of the valve, said means consisting of a cam surface rigidly attached throughout to one and a rigidly supported member adjustably attached to the other, which member rides on said cam surface as the valve is turning axially, its point of contact traveling in a circular path concentric with the longitudinal axis of the stem, means for adjusting the distance of said point of contact from the longitudinal axis of the stem, said cam surface terminating at each circumferential end in a surface substantially perpendicular to the longitudinal axis of said stem, on one of which surfaces the said member rests when the valve is in a completely open or closed position, the contour of said cam surface being such that the rate of variation of free area of opening of the valve per unit arc of axial turning of the stem changes when the distance of said point of contact from the longitudinal axis of said stem is changed, means for holding said member in contact with said cam surface and means for tightly wedging said valve to its seat when in a closed position comprising interlocking projections attached to said stem and casing, substantially as described.

8. In a valve of the type described, means for varying the free area of opening of the valve, said means consisting of a cam surface rigidly attached throughout to the valve casing, and a rigidly supported member on the valve stem which rides on the said cam surface as the valve stem is turned axially, its point of contact traveling in a circular path concentric with the axis of the valve stem, said member on the valve stem being adjustable toward and from the valve stem, the contour of said cam surface being such that the rate of variation of free area of opening of the valve per unit arc of axial turning of the stem changes when the distance of said point of contact from the longitudinal axis of said stem is changed and means for holding said member in contact with said cam surface, substantially as described.

9. In a valve of the type described, means for varying the free area of opening of the valve, said means consisting of a cam surface rigidly attached throughout to the valve casing, a screw threaded through a rigid part of the valve operating means the axis of which is substantially parallel with the datum plane of the said cam surface, and a circular bead on the inner end of said screw the upper side of which rests in contact with a rigid part of the valve operating means and the under side of which rides on said cam surface as the valve is turned axially, the contour of said cam surface being such that the rate of variation of free area of opening of the valve per unit arc of axial turning of the stem changes when the distance of said point of contact from the longitudinal axis of said stem is changed and means for holding said bead in contact with said cam surface, substantially as described.

In testimony that I claim the foregoing as my invention, I affix my signature in the presence of two subscribing witnesses this 11 day of December, 1914.

CHARLES D. ALLAN.

Witnesses:
F. M. REICHEL,
ALEX. D. KING, Jr.